United States Patent [19]

Wansley et al.

[11] Patent Number: 5,327,398
[45] Date of Patent: Jul. 5, 1994

[54] FISHFINDER WITH READOUT OF BOTTOM COVERAGE

[75] Inventors: Keith L. Wansley, Plant City, Fla.; Jeffrey O. Fellows, Hudson, N.H.

[73] Assignee: Raytheon Company, Lexington, Mass.

[21] Appl. No.: 139,230

[22] Filed: Oct. 19, 1993

[51] Int. Cl.⁵ .............................................. G01S 15/96
[52] U.S. Cl. .................................... 367/108; 367/111
[58] Field of Search ................... 367/111, 108; 43/4.5, 43/17.1

[56] References Cited

U.S. PATENT DOCUMENTS 5,184,330  2/1993  Adams et al. ...................... 367/111

Primary Examiner—Daniel T. Pihulic
Attorney, Agent, or Firm—William R. Clark; Richard M. Sharkansky

[57] ABSTRACT

A fishfinder having a real time or A-scope display with a numerical readout indicating the diameter of the transducer beam on the bottom of the water body. Further, an indicia indicating the position of the boat and downwardly diverging lines corresponding to the transducer beam are overlaid on the display.

12 Claims, 2 Drawing Sheets

FISHFINDER WITH READOUT OF BOTTOM COVERAGE

BACKGROUND OF THE INVENTION

The field of the invention generally relates to sonar fishfinder systems, and more particularly relates to apparatus and method for providing a visual A-Scope display of current returns or echoes from the transducer beam.

As is well known in the field of sonar, echo sounders, which are commonly referred to as depth sounders or fishfinders, are used to provide the user with a generalized picture or image of what is under a boat or other vessel. In particular, a transducer converts an electrical transmitter pulse into an ultrasonic or high frequency energy wave that is transmitted downwardly in the water. The energy or sound wave travels downwardly in a pattern substantially characteristic of a cone, and reflects upwardly from obstructions such as the sea bottom, fish, or other submerged objects. The returns or echoes are received by the transducer during a listening interval, and converted to electrical signals. A processor converts the electrical signals into an image which is displayed on a screen such as on a CRT or LCD display. As is well known, the elapsed time for pulse energy to travel down though the water and back up as an echo is measured by the processor, and used to determine the depth at which objects are displayed.

Commonly, fishfinders graphically display historical information of what has passed under the fishfinder's transducer as the boat moves along. Also, in what is commonly referred to as an A-scope display, a real time image of what is currently under the transducer is displayed, typically juxtaposed to the historical image. Further, it is common to provide a readout of a numerical value indicating the water depth, or depth to the sea bottom. However, one drawback expressed by users is that it may be difficult to determine how far the fish are laterally from the side of the boat. For example, in the A-scope display, the user may know that fish are in the cone of the transducer beam near the bottom, and that the depth is, for example, 100 feet. However, he doesn't know how far laterally or horizontally the fish could be. Therefore, he doesn't know whether to keep his line close to the side of the boat, or also to try casting away from the boat.

SUMMARY OF THE INVENTION

In accordance with the invention, a fishfinder system for determining and displaying the location of fish or other targets in a body of water surrounding a boat comprises an electromechanical transducer means for transmitting sound waves in a substantially conical beam into the body of water, for receiving corresponding echoes from obstructions including fish in the path of the sound waves and from the bottom of the body of water, and for generating electrical signals in accordance with the received echoes. The fishfinder further comprises an electrical transmitter means coupled to the transducer means for controlling transmission of the sound waves by the transducer means and receiver means coupled to the transducer means for receiving and processing the electrical signals produced by the transducer means and for producing an output in accordance therewith. A processor means is coupled to the receiver means for converting the output of the receiver means into electrical data representative of a display image of the received echoes in the form of a triangular cross-section of the conical beam. The processor means comprises means for determining a numerical value corresponding to the coverage of the conical beam on the bottom of the body of water. The fishfinder further comprises visual display means coupled to the processor and including a screen for displaying the echo display image and the numerical value corresponding to the coverage of the conical beam on the bottom of the body of water.

With such arrangement, the user is provided with a clear indication of the size or the lateral dimensions of the beam and the displayed echo image on the bottom of the body of water. Therefore, it is relatively easy to determine or interpolate the maximum lateral distance of displayed fish. That is, it is easy to determine if fish are directly under the boat, or if they could be out to the side where casting or moving the boat might be necessary. In any event, the user gets an indication of the size or coverage of the echo display.

Preferably, the processor means further comprises means for overlaying the echo display image with downward diverging lines corresponding to sides of the triangular cross-section of the conical beam. Therefore, the user is provided with a graphical display from which it is relatively easy to interpolate the diameter of the beam at the depth of the fish from the displayed coverage of the conical beam on the bottom of the body of water. It is also preferable that the processor further comprises means for generating an image or indicia representative of the boat and for displaying the boat image above an apex of the diverging lines. Therefore, a composite image is provided that shows the spacial relationship between the boat, the conical beam of the transducer from which the echoes are being received, and the bottom for which the numerical value corresponding to coverage is displayed. The numerical value is preferably the diameter of the beam on the bottom of the body of water. It may also be desirable that the processor comprises means for generating an echo display image corresponding to a history of received echoes, and for displaying the history image on the screen juxtaposed with the image in the form of a triangular cross-section of the conical beam.

The invention may also be practiced by a method of determining and displaying the location of fish or other targets in a body of water surrounding a boat, the method comprising the steps of transmitting sound waves from a transducer in a substantially conical beam into the body of water and receiving corresponding echoes from obstructions including fish in the path of the sound waves and from the bottom of the body of water. The method further comprises the steps of generating electrical signals in accordance with the received echoes and converting the electrical signals into electrical data representative of an echo display image of the received echoes in the form of a triangular cross-section of the conical beam. The method also comprises the steps of determining a numerical value corresponding to the coverage of the conical beam on the bottom of the body of water and visually displaying the image and the numerical value corresponding to the coverage of the conical beam on the bottom of the body of water.

BRIEF DESCRIPTION OF THE DRAWINGS

The foregoing objects and advantages will be more fully understood by reading the following description of the preferred embodiment with reference to the drawings wherein.

DESCRIPTION OF THE PREFERRED EMBODIMENT

Figure 1:
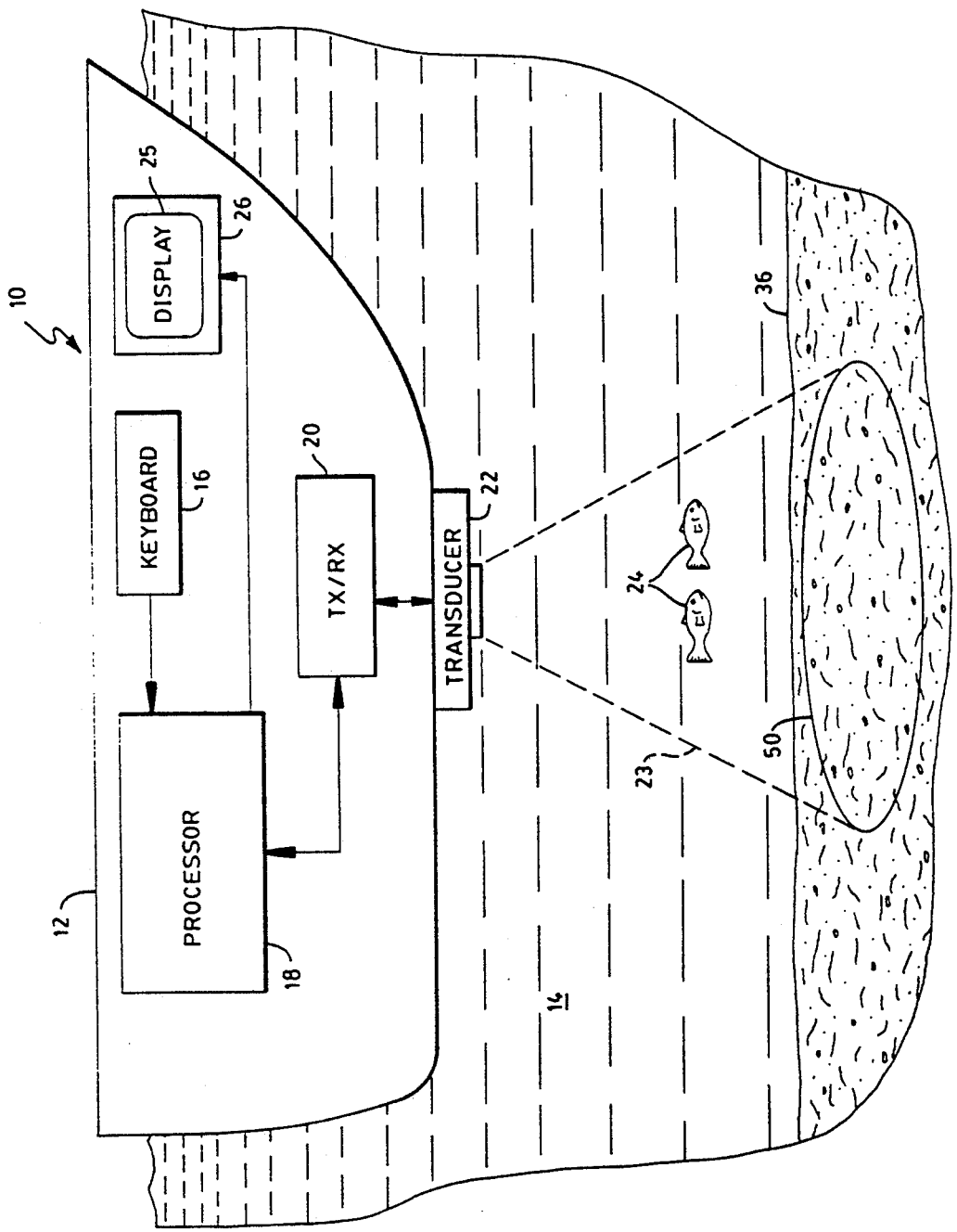
FIG. 1 is a block diagram of a fishfinder system in a boat.

Referring to FIG. 1, a highly simplified block diagram of a fishfinder 10 or depth sounder is shown disposed in a boat 12 in a body of water 14. Fishfinder 10 includes a keyboard 16 by which control information and modes can be input to processor 18. In response thereto, processor 18 controls the operation of the transmitter portion of transmitter/receiver (TX/RX) 20 which produces a drive signal to control transducer 22. For example, the drive signal may be at a frequency of 200 KHz with pulse widths between 0.2 and 0.5 milliseconds.

In conventional manner, electromechanical transducer 22 is mounted to the underside of the boat 12. Transducer 22 converts the electrical drive signal from the transmitter portion of TX/RX 20 into sound waves that are transmitted into the body of water 14 which may, for example, be a lake or ocean. The sound waves or energy is generally transmitted in a radiation pattern that is axi-symmetrical. That is, the radiated energy generally decreases away from the center or centerline of the pattern to form a beam 23 that is generally conically shaped. For example, the radiated energy may decrease to −3 dB which represents the 50% power point at an angle of 8 degrees on either side of the centerline. For this example, the effective beam angle of coverage or beamwidth of the transducer 22 would be 16 degrees between the −3 dB points.

The transmitted sound waves reflect back to transducer 22 from any discontinuities or obstructions in water 14, and, in any event, from the bottom 36 of the body of water 14. For example, reflections or echoes can be received from fish 24 or schools of fish. Transducer 22 generates electrical signals in accordance with the received echoes, and the electrical signals are coupled to and processed in conventional manner in the receiver portion of TX/RX 20. That is, the output of the receiver portion of TX/RX 20 is coupled to processor 18 which converts the output into electrical data representative of an echo display image of the received echoes. For example, in what is referred to as an A-scope display, an echo display image of real time echoes is arranged in a triangular cross-section corresponding to the conical beam of transducer 22. The display image is coupled to the screen 25 of display 26.

Figure 2:
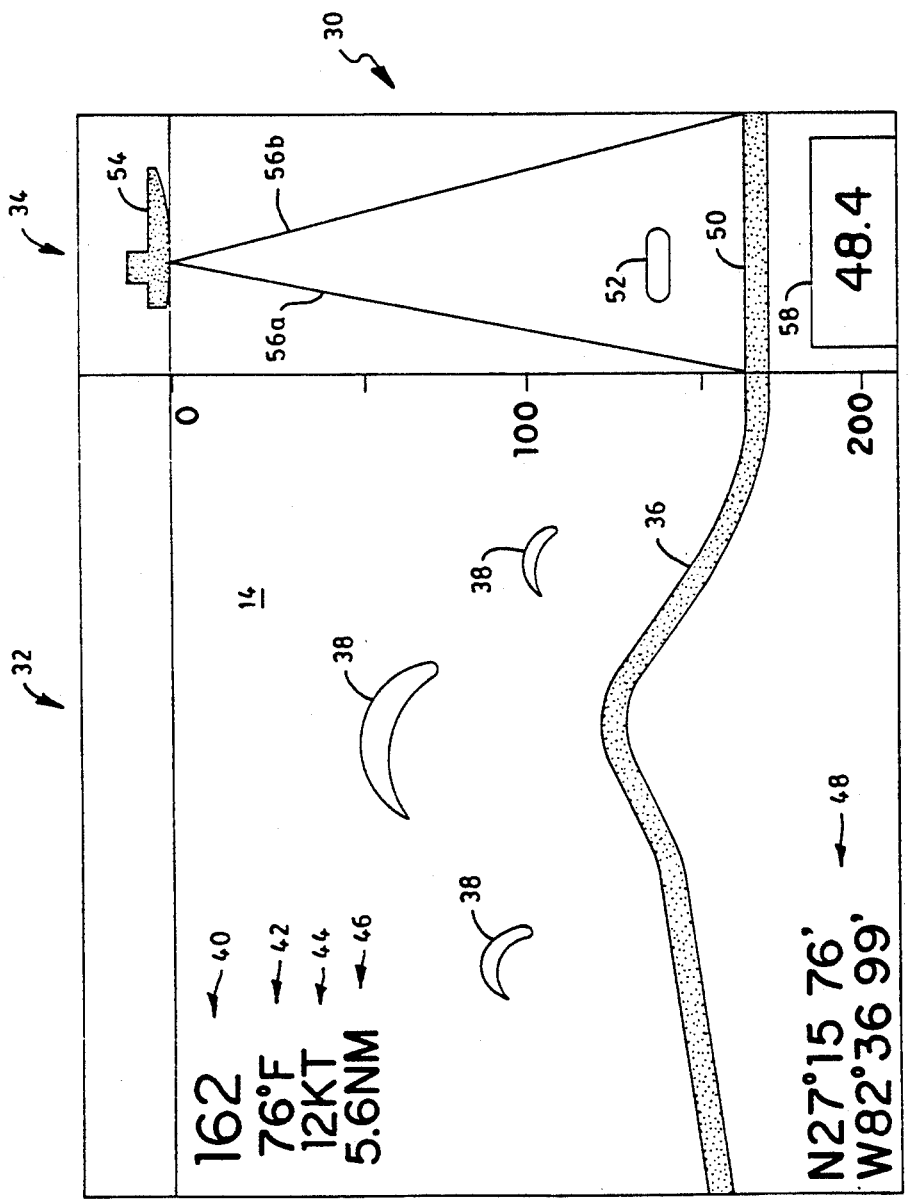
FIG. 2 is a view of a display screen produced by the fishfinder system.

Referring to FIG. 2, an echo image 30 as generated by processor 18 is displayed on screen 25. Display image 30 here includes a historical portion 32 and a so-called A-scope portion 34. The generation of the historical portion 32 by processor 18 and its display on screen 25 are conventional. In particular, echoes that are received over an interval of time as the boat 12 moves through the water 14 are stored, and then an echo display image 32 is generated which represents the received echoes over that time. As new echo data is received, old data at the trailing edge of the historical time interval is discarded as the display is updated. Here, echo or return data is displayed for bottom 36 and objects 38 such as fish or schools of fish that are suspended in the body of water 14. The depth of water 14 can be visually determined from the scale along the right side of the historical portion 32, and there is also a digital readout 40 displayed. Here, for example, the current depth of water 14 is 162 feet. Further, there is optionally provided a water temperature readout 42, a boat speed readout 44, a trip log distance readout 46, and a position readout 48 as provided to processor 18 from a navigational aid. Here, for example, the water temperature is 76 degrees Fahrenheit, the boat speed is 12 knots, the trip log distance is 5.6 nautical miles, and the position is North 27° 15 76′ West 82° 36 99′.

The A-scope portion 34 shows a real time display of received echoes currently in the beam 23 of transducer 22. In particular, real time received echoes are used to generate a echo image display including a current footprint 50 on the bottom 36 and suspended objects 52, if any, such as fish or schools of fish. Processor 18 generates an image of indicia 54 or representation for the boat 12, and overlays the boat indicia 54 over the echo image 30. In particular, the indicia 54 of boat 12 is displayed at the top to provide the user with a clear graphic understanding of where the boat 12 is relative to the echoes or returns from objects 52 and bottom footprint 50. Also, processor 18 generates and overlays two diverging lines 56a and b on the echo image to represent the triangular cross-section of the conical beam 23 of the transducer 22. The indicia 54 of the boat 12 is displayed above the apex of diverging lines 56a and b to give the user a clear understanding of the "field of view".

In accordance with the invention, processor 18 calculates the diameter of the conical beam 23 of transducer 22 on the bottom 36, and displays the diameter 58 at the bottom of the A-scope portion 34 of the display. In particular, the diameter 58 of the beam 23 or width of beam coverage on the bottom 36 is here displayed to be 48.4 feet. That is, the footprint 50 is 48.4 feet across. Therefore, the user has an easily understandable graphic and numerical representation of how far the object 52 such as fish could be in the lateral direction. For example, object 52 such as fish are near the bottom 36, so object 52 is located within a diameter of approximately 48.4 feet, or slightly less, directly below the boat 12. Therefore, depending on the width of the boat 12, object 52 would typically be within 20 feet of each side of boat 12.

Figure 3:
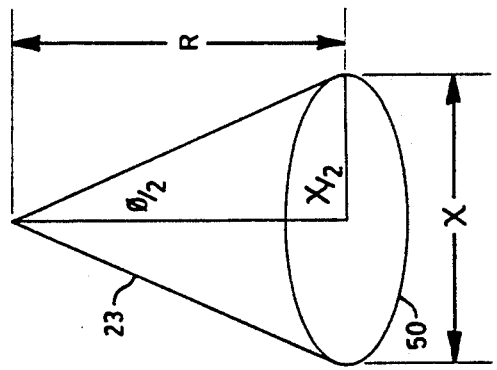
FIG. 3 is a cone representing the transducer beam of the fishfinder system.

Referring again to FIG. 1, the beam 23 of transducer 22 is shown as a cone thereby projecting a circular footprint 50 on bottom 36. As described earlier, processor 18 calculates and provides to display 26 a numerical value of the diameter 58 of circular footprint 50. With reference to FIG. 3, processor 18 calculates the numerical value for diameter 58 according to the following equation:

$$X = 2R \tan(\theta/2)$$

where X is the diameter, R is the range (i.e. the water depth as conventionally calculated), and $\theta$ is the beam angle which is particular to the transducer 22 being used. For example, for a water depth R of 100 feet and a transducer 22 having a beam angle of 17°, the diameter of coverage would be approximately 30 feet.

In summary, processor 18 calculates a numerical value for the diameter 58 of the beam 23 of transducer 22 on the bottom 36 of the body of water 14. That diameter 58 is displayed below the A-scope display to provide the user with a clear indication of the bottom coverage being displayed. Alternately, some other coverage parameter such as radius could be displayed. Also, an indicia 54 of the boat 12 is overlaid on the echo image 30 in the A-Scope portion 34, and diverging lines 56a and 56b extend downwardly from the boat indicia 54 to give a clear picture of the spacial relationship between the boat 12 in its present position, the transducer beam 23, any objects 52 such as fish in the beam 23, and the size or coverage of the beam 23 on the bottom 36.

This concludes the description of the preferred embodiment. A reading of it by one skilled in the art will bring to mind many alterations and modifications that do not depart from the spirit and scope of the invention. Therefore, it is intended that the scope of the invention be limited only by the appended claims.

What is claimed is:

1. A fishfinder system for determining and displaying the location of fish or other targets in a body of water surrounding a boat, the system comprising:
    electromechanical transducer means for transmitting sound waves in a substantially conical beam into said body of water, for receiving corresponding echoes from obstructions including fish in the path of said sound waves and from the bottom of the body of water, and for generating electrical signals in accordance with said received echoes;
    electrical transmitter means coupled to said transducer means for controlling transmission of said sound waves by the transducer means;
    receiver means coupled to said transducer means for receiving and processing said electrical signals produced by said transducer means and for producing an output in accordance therewith;
    processor means coupled to said receiver means for converting the output of said receiver means into electrical data representative of a display image of said received echoes in the form of a triangular cross-section of said conical beam;
    said processor means comprising means for determining a numerical value corresponding to the coverage of said conical beam on said bottom of said body of water; and
    visual display means coupled to said processor and including a screen for displaying said echo display image and said numerical value corresponding to said coverage of said conical beam on said bottom of said body of water.

2. The fishfinder system recited in claim 1 wherein said processor means further comprises means for overlaying said echo display image with downward diverging lines corresponding to sides of said triangular cross-section of said conical beam.

3. The fishfinder recited in claim 2 wherein said processor further comprises means for generating an image representative of said boat and for displaying said boat image above an apex of said diverging lines.

4. The fishfinder recited in claim 2 wherein said numerical value corresponding to the coverage of said conical beam on said bottom of said body of water is displayed below said diverging lines.

5. The fishfinder recited in claim 1 wherein said numerical value corresponds to the diameter of said conical beam on said bottom of said body of water.

6. The fishfinder recited in claim 1 wherein said processor further comprises means for generating an echo display image corresponding to a history of received echoes, and for displaying said history image on said screen juxtaposed with said image in the form of a triangular cross-section of said conical beam.

7. A method of determining and displaying the location of fish or other targets in a body of water surrounding a boat, comprising the steps of:
    transmitting sound waves from a transducer in a substantially conical beam into said body of water;
    receiving corresponding echoes from obstructions including fish in the path of said sound waves and from the bottom of the body of water;
    generating electrical signals in accordance with said received echoes;
    converting said electrical signals into electrical data representative of an echo display image of said received echoes in the form of a triangular cross-section of said conical beam;
    determining a numerical value corresponding to the coverage of said conical beam on said bottom of said body of water; and
    visually displaying said image and said numerical value corresponding to the coverage of said conical beam on said bottom of said body of water.

8. The method recited in claim 7 comprising a step of displaying said image with downward diverging lines corresponding to sides of said triangular cross-section of said conical beam.

9. The method recited in claim 8 further comprising a step of displaying a representation of said boat above an apex formed by said two downward diverging lines.

10. The method recited in claim 9 further comprising a step of displaying said numerical value below said diverging lines.

11. The method recited in claim 7 wherein said numerical value is the diameter of said beam on said bottom.

12. The method recited in claim 7 further comprising a step of generating a display image corresponding to a history of received echoes, and displaying said history image juxtaposed with said image in the form of a triangular cross-section of said conical beam.

* * * * *